United States Patent [19]

George, Jr. et al.

[11] Patent Number: 4,536,528

[45] Date of Patent: Aug. 20, 1985

[54] STABLE MINERAL SPIRIT DISPERSIONS OF CARBOXYL-CONTAINING POLYMERS

[75] Inventors: Thomas R. George, Jr., Wooster; Robert Y. Lochhead, Jr., Avon Lake, both of Ohio

[73] Assignee: The B. F. Goodrich Company, Akron, Ohio

[21] Appl. No.: 629,040

[22] Filed: Jul. 9, 1984

[51] Int. Cl.$^3$ .......................... C08K 5/10; C08L 33/02; C08L 53/00

[52] U.S. Cl. .................................... 524/313; 523/436; 524/556

[58] Field of Search ................. 523/436; 524/313, 556

[56] References Cited

U.S. PATENT DOCUMENTS

| | | | |
|---|---|---|---|
| 2,479,410 | 8/1949 | Rothrock et al. | 524/313 |
| 3,068,183 | 12/1962 | Strolle | 524/310 |
| 3,196,121 | 7/1965 | McKay et al. | 524/313 |
| 3,661,824 | 5/1972 | Patitsas et al. | 524/313 |
| 3,721,639 | 3/1973 | Gattus et al. | 524/313 |
| 3,875,091 | 4/1975 | Tsugukuni et al. | 524/313 |
| 3,887,515 | 6/1975 | Pennington et al. | 523/436 |
| 4,200,561 | 4/1980 | Chang | 524/313 |
| 4,451,604 | 5/1984 | Mills | 524/313 |

OTHER PUBLICATIONS

Hackh's Chemical Dictionary, McGraw Hill Publishers N.Y., N.Y., 1972, pp. 431, 630 & 631.

*Primary Examiner*—Ronald W. Griffin
*Attorney, Agent, or Firm*—George A. Kap; Alan A. Csontos

[57] ABSTRACT

Dispersions or slurries of carboxyl-containing polymers in mineral spirits in which the polymer settles and is difficultly redispersible are converted to dispersions or slurries in which the tendency to settle is reduced and which are readily redispersible with minimum agitation are obtained when there is added to the dispersions or slurries a linear or branched block copolymer of propylene oxide and ethylene oxide as well as glyceryl tris-12-hydroxystearate and/or mixed saturated $C_{18}$-$C_{36}$ fatty acid triglycerides.

15 Claims, No Drawings

STABLE MINERAL SPIRIT DISPERSIONS OF CARBOXYL-CONTAINING POLYMERS

BACKGROUND OF THE INVENTION

Carboxyl-containing polymers, homopolymers, or copolymers with other vinylidene monomers containing at least one terminal $CH_2<$ group, of unsaturated polymerizable carboxylic acids such as acrylic acid, methacrylic acid, maleic acid, itaconic acid and the like are useful thickening agents. These polymer acids often are cross-linked with small amounts of cross-linking agents. One class of these polymeric materials are prepared by polymerization of the acid with a free radical catalyst in mineral spirits in a closed vessel or autoclave with stirring.

The carboxyl-containing polymers dispersed in mineral spirits find many applications. However, upon storage, the dispersed polymer generally settles to the lower portion of the container and often is very difficult or impossible to redisperse. Mineral spirit dispersions of carboxyl-containing polymers that are readily redispersed by shaking or simple stirring, even after long periods of storage, are desired.

The patent application of K. E. Burnfield, entitled "Stabilization of Mineral Spirit Dispersions of Carboxyl-Containing Polymers", filed Oct. 24, 1983 and bearing Ser. No. 06/544342, now abandoned, discloses stabilization of the carboxyl containing polymers in mineral spirits by the addition of a glyceryl tris-12-hydroxystearate and/or mixed saturated $C_{18-36}$ fatty acid triglycerides. Such dispersions were thought to be stable, however, it was discovered that when these dispersions were transported in 55-gallon drums, the solids settled as a hard cake that was very difficult to redisperse.

SUMMARY OF THE INVENTION

Dispersions or slurries of carboxyl-containing polymers in mineral spirits in which the polymer settles and is difficultly redispersible are converted to dispersions or slurries in which the tendency to settle is reduced and which are readily redispersible with minimum agitation. These are obtained when there is added to the dispersions or slurries a block copolymer of propylene oxide and ethylene oxide, and glyceryl tris-12-hydroxystearate and/or mixed saturated $C_{18-36}$ fatty acid triglycerides.

DETAILED DESCRIPTION OF THE INVENTION

This invention relates to stable slurries or dispersions of carboxyl-containing polymers in mineral spirits which contain a sufficient amount of a block copolymer of propylene oxide and ethylene oxide and a sufficient amount of a glyceryl tris-12-hydroxystearate and/or mixed saturated $C_{18-36}$ fatty acid triglycerides. The block copolymers are recognized surfactants whereas the hydroxystearates and the triglycerides are recognized thickeners or stabilizers for mineral spirits. The block copolymers by themselves and the hydroxystearates and/or the triglycerides by themselves do not provide the desired stability against solids settling, however, when a block copolymer is used together with the hydroxystearate and/or mixed glycerides, the desired stability is attained. In the combination noted herein, the desired stability is not attained when other materials were tried in place of the block copolymer.

In the system described herein, there is slight syneresis resulting in settling of up to about 15% of total volume, however, the settled solids are easily redispersible, unlike the hard cake in the case of earlier dispersions. Furthermore, the stabilized dispersions described herein have storage life of at least 6 months, including shipping or transportation of such dispersions.

Preparation of the carboxyl-containing polymer slurries or dispersions is accomplished by polymerization of the carboxyl-containing monomers, optionally with other vinylidene comonomers, in mineral spirits in the presence of a free radical catalyst in a closed vessel in an inert atmosphere under autogenous pressure or artifically-induced pressure, or in an open vessel in an inert atmosphere under reflux at atmospheric pressure. Temperature of the polymerization may be varied from about 0° to 125° C. or lower or higher. Polymerization at 25° C. to 90° C. using a free radical catalyst is generally effective in producing polymer yields of 75 percent to 100 percent. The monomer may be batch charged or continuously added during the course of polymerization or by any other manner of polymerization techniques conventionally used.

Typical free radical forming catalysts include peroxygen compounds such as sodium, potassium and ammonium persulfates, caprylyl peroxide, benzoyl peroxide, hydrogen peroxide, pelargonyl peroxide, cumene hydroperoxides, tertiary butyl diperphthalate, tertiary butyl perbenzoate, sodium peracetate, sodium (2-ethylhexyl)percarbonate, and the like, as well as azo catalysts such as azodiisobutyryl nitrile. Other catalysts utilizable are the co-called "redox" type of catalyst and the heavy-metal activated catalyst systems. Ultraviolet light may also be used as a source of free radicals. Some systems polymerize solely by heat, but catalysts provide better control.

The mineral spirits used as the polymerization media is a clear, combustible, petroleum liquid product, normally containing a major proportion of liquid aliphatic hydrocarbon materials. The specific gravity normally ranges from about 0.75 to about 0.81, with a boiling range from about 150° C. to about 220° C. While the flash point is normally above about 40° C., for safety reasons, the flash point may be above about 60° C. A material having a composition of 0 to less than 5 percent aromatics, about 40 to about 80 percent paraffins and about 15 to about 60 percent naphtha, having a flash point about 60° C., produces good results.

The amount of mineral spirits used normally will be in excess of the monomers to be polymerized and while the proportion may vary from at least 1 weight percent of monomers and 99 weight percent mineral spirits up to about 60 weight percent monomers and 40 weight percent mineral spirits, more normally, a concentration of about 25 to about 50 weight percent monomers is employed to obtain high solids content dispersions.

In the practice of the invention, the polymerizations may be either batch, semi-batch, or continuous. The agitation may be any agitation sufficient to maintain the slurry and obtain effective heat transfer including, for example, helical agitation, pitched turbines and the like. A useful reaction temperature range is from the range of 20° C. to 90° C. at about 1 atmosphere or more. Normal polymerization time is from about 3 to 12 hours.

The carboxyl-containing polymers are prepared from vinylidene monomers containing at least one activated $>C=C<$ group and carboxyl group. Such polymers may be homopolymers of an unsaturated, polymerizable carboxylic monomers such as acrylic acid, methacrylic acid, maleic acid, itaconic acid and the like, or copolymers thereof. The carboxyl containing polymers, in the absence of a cross-linking agent, have weight average molecular weights greater than 500 to as high as several million, generally 1,000 to 2,000,000 and preferably greater than about 10,000 to 1,000,000 or more. Of course, in the presence of a cross-linking agent, even higher molecular weights are achieved.

Typical materials are those described in U.S. Pat. No. 2,798,053. Copolymers, for example, include copolymers of acrylic acid with small amounts of polyalkylenyl polyether cross-linkers that are gel-like polymers, which especially in the form of their salts, absorb large quantities of water or solvents with subsequent substantial increase in volume. Other useful carboxyl-containing polymers are described in U.S. Pat. No. 3,940,351, directed to polymers of unsaturated carboxylic acid and at least one alkyl acrylic or methacrylic ester where the alkyl group contains 10 to 30 carbon atoms. Other types of such copolymers are described in U.S. Pat. No. 4,062,817 wherein the polymers described in U.S. Pat. No. 3,940,351 contain additionally another alkyl acrylic or methacrylic ester where the alkyl groups contain 1 to 8 carbon atoms. Carboxylic polymers and copolymers, such as those of acrylic acid and methacrylic acid, also may be cross-linked with polyfunctional materials as divinyl benzene, unsaturated diesters and the like, as is disclosed in U.S. Pat. Nos. 2,340,110; 2,340,111; and 2,533,635.

The carboxylic monomers useful in the production of polymers of this invention are the olefinically-unsaturated carboxylic acids containing at least one activated carbon-to-carbon olefinic double bond, and at least one carboxyl group; that is, an acid containing an olefinic double bond which readily functions in polymerization because of its presence in the monomer molecule, either in the alpha-beta position with respect to a carboxyl group, —C=C—COOH, or as parts of a terminal methylene grouping, CH$_2$=C<. Olefinically-unsaturated acids of this class include such materials as the acrylic acids typified by the acrylic acid itself, alpha-cyano acrylic acid, methylacrylic acid, alpha-phenyl acrylic acid, beta-acryloxy propionic acid, sorbic acid, maleic acid, and the like. As used herein, the term "carboxylic acid" includes the polycarboxylic acids and those acid anhydrides, such as maleic anhydride, wherein the anhydride group is fomred by the elimination of one molecule of water from two carboxyl groups located on the same polycarboxylic acid molecule. Maleic anhydride and other acid anhydrides useful herein have the general structure

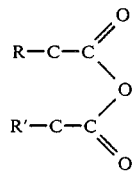

wherein R and R' are selected from the group consisting of hydrogen, halogen and cyanogen (—C≡N) groups and alkyl, aryl, alkaryl, aralkyl, and cycloalkyl groups such as methyl, ethyl, propyl, octyl, decyl, phenyl, tolyl, xylyl, benzyl, cyclohexyl, and the like.

The preferred carboxylic monomers are the mono-olefinic acrylic acids having the general structure

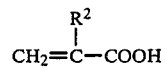

wherein $R^2$ is a substituent selected from the class consisting of hydrogen, halogen, and the cyanogen (—C≡N) groups, monovalent alkyl radicals, monovalent aryl radicals, monovalent aralkyl radicals, monovalent alkaryl radicals and monovalent cycloaliphatic radicals. Of this class, acrylic and methacrylic acids are most preferred. Another useful carboxylic monomer is maleic anhydride or the acid.

The polymers contemplated include both homopolymers of carboxylic acids or anhydrides thereof, or the defined carboxylic acids copolymerized with one or more other vinylidene monomers. Such monomers include, for example, acrylate ester monomers including those acrylic acid ester monomers such as derivatives of an acrylic acid represented by the formula

wherein $R^3$ is an alkyl group having from 1 to 30 carbon atoms, preferably 1 to 20 carbon atoms and $R^2$ is hydrogen, methyl or ethyl. Such monomers are present in the copolymer in amount, for example, from about 1 to 40 weight percent or more. Representative acrylates include methyl acrylate, ethyl acrylate, isopropyl acrylate, butyl acrylate, methyl methacrylate, ethyl methacrylate, octyl acrylate, octyl methacrylate, 2-ethylhexyl methacrylate, and the like; higher alkyl acrylic esters are decyl acrylate, lauryl acrylate, strearyl acrylate, and the corresponding methacrylates. Mixtures of two or three or more long chain acrylic esters may be successfully polymerized with one of the carboxylic monomers.

The polymers also may be cross-linked with any poly-functional vinylidene monomer containing at least 2 terminal CH$_2$< groups, including for example, butadiene, isoprene, divinyl benzene, divinyl naphthlene, allyl acrylates and the like. Particularly useful cross-linking monoemrs for use in preparing the copolymers are polyalkenyl polyethers having more than one alkenyl ether grouping per molecule. The most useful possess alkenyl groups in which an olefinic double bond is present attached to a terminal methylene grouping, CH$_2$=C<. They are made by the etherification of a polyhydric alcohol containing at least 3 carbon atoms and at least 2 hydroxyl groups. Compounds of this class may be produced by reacting an alkenyl halide, such as allyl chloride or allyl bromide, with a strongly alkaline aqueous solution of one or more polyhydric alcohols. The product is a complex mixture of polyethers with varying numbers of ether groups. Analysis reveals the average number of ether groupings on each molecule. Efficiency of the polyether cross-linking agent increases with the number of potentially polymerizable groups on the molecule. It is preferred to utilize polyethers containing an average of two or more alkenyl ether groupings per molecule. Other cross-linking monomers include for example, diallyl esters, dimethallyl ethers, allyl or methallyl acrylates and acrylamides, tetraallyl tin, tetravinyl silane, polyalkenyl methanes, diacryates, and dimethacrylates, divinyl compounds such as divinyl benzene, polyallyl phosphate, phosphate esters and the like. Typical agents are allyl pentaerythritol, allyl sucrose, trimethylolpropane triacrylate, 1,6-hexanediol diacrylate, trimethylolpropane diallyl ether, and the like. Allyl pentaerythritol, trimethylolpropane diallylether and allyl sucrose provide excellent polymers. When the cross-linking agent is present, the polymeric mixtures usually contain up to about 5% or more by weight of cross-linking monomer based on the total of carboxylic acid monomer, plus other monomers, if present, and more preferably about 0.01 to 2.0 weight percent.

Other vinylidene monomers may also be used, including the acrylic nitriles, and α,β-olefinically unsaturated nitriles. Preferred nitriles are the monoolefinically unsaturated nitriles having from 3 to 10 carbon atoms such as acrylonitrile, methacrylonitrile and the like. Most preferred are acrylonitrile and methacrylonitrile. The amounts used, for example, for some polymers are from about 1 to 30 weight percent of the total monomers copolymerized. Acrylic amides, including monoolefinically unsaturated amides, also may be used. These have at least one hydrogen on the amide nitrogen and the olefinic unsaturation is alpha-beta to the carbonyl group. Representative amides include acrylamide, methacrylamide, and the like. Very much preferred are acrylamide and methacrylamide used in amount, for example, from about 1 to 30 weight percent of the total monomers copolymerized. Also included are other acrylic amides such as N-alkylol amides of alpha,beta-olefinically unsaturated carboxylic acids containing 4 to 10 carbon atoms, such as N-methylol acrylamide, N-propanol acrylamide, N-methylol methacryamide, N-methylol maleimide, and others. α-olefins containing from 2 to 12 carbon atoms; dienes containing from 4 to 10 carbon atoms; vinyl esters and allyl esters such as vinyl acetate; vinyl aromatics such as styrene, methyl styrene, chloro-styrene; vinyl and allyl ethers and ketones such as vinyl methyl ether and methyl vinyl ketone; chloroacrylates and cyanoalkyl acrylates such as α-cyanomethyl acrylate, α-,β- and Y-cyanopropyl acrylate; alkoxyacrylates such as methoxy ethyl acrylate; haloacrylates such as chloroethyl acrylate; vinyl halides such as vinyl chloride and vinylidene chloride; divinyls, diacrylates and other polyfunctional monomers such as divinyl ether, diethylene glycol diacrylate, ethylene glycol dimethacrylate, methylene-bis-acrylamide, allylpentaerythritol, and the like; and bis(β-haloalkyl) alkenyl phosphonates such as bis(β-chloroethyl) vinyl phosphonate and the like. Copolymers wherein the carboxyl-containing monomer is a minor constituent and the other vinylidene monomers are present as major components are readily prepared in accordance with the process of this invention.

These copolymers may include as little as 8 weight percent of the total polymer of a carboxyl containing monomer, up to 100 percent, i.e., homopolymer. Particularly useful copolymers contain greater than 40 percent acid and preferably greater than 70 weight percent acid.

The block copolymers suitable herein are those propylene oxide and ethylene oxide, which can be linear or branched. The linear copolymers are readily prepared by the sequential addition of propylene oxide and ethylene oxide to a propylene glycol base. These materials have the general structure

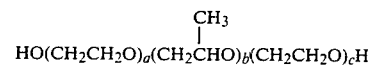

wherein a, b, and c are integers relating to the molecular weight and propylene oxide and ethylene oxide content of the molecule. The branched block copolymers are generally prepared by the sequential addition of propylene oxide and ethylene oxide to a triol, an aliphatic alcohol containing three hydroxyl groups such as trimethylolpropane. The tetrafunctional materials are prepared by sequential additions of propylene oxide and ethylene oxide to ethylene diamine.

Block copolymers of propylene oxide and ethylene oxide are commercially available as Pluronic, Pluradot and Tetronic polyols from BASF and Wyandotte Corporation. The Pluronic materials are linear block copolymers, the Pluradot materials are trifunctional liquid polyethers based on alkoxylated (polyoxyethylne and polyoxypropylene) triols, and the Tetronic polyols are branched tetrafunctional polyoxyethylene-polyoxypropylene polyols which are prepared by the tetraaddition of propylene oxide and ethylene oxide sequentially to ethylene diamine. In the Pluronic class of linear block copolymers, Pluronic L-64 is polyoxyethylene-polyoxypropylene block copolymer with a molecular weight of 2900; and Pluronic L-122 is also a polyoxyethylene-polyoxypropylene block copolymer in which the polyoxypropylene unit has a molecular weight of 4000 and which contains 20% by weight polyoxyethylene. Tetronic 1102 is a branched block copolymer with molecular weight of 6,200 and containing 20% polyethylene oxide. Pluradot HA-40 is a trifunctional block copolymer of polyoxyethylene-polyoxypropylene polyol having molecular weight of 3200.

The block copolymers useful in the practice of this invention have number average molecular weights in the range of greater than about 1000 to about 20,000. Excellent results have been obtained with linear block copolymers having molecular weights in the range of about 2500 to about 14,500. Good results have also been obtained with branched block copolymers having molecular weights of about 3000 to about 8000. The polyoxyethylene content of the block copolymers is from about 10 weight percent to about 80 weight percent. Excellent results have been observed with block copolymers containing 10 to 80 weight percent polyoxyethylene units. The amount of the block copolymers used in the polymerization process is greater than about 0.1 to less than 10 weight parts per 100 weight parts of the dispersion, more preferably, from about 0.5 to about 3 weight parts.

The additives that, in conjunction with the block copolymers, were found to be especially useful in providing readily redispersible dispersions or slurries of carboxyl-containing polymers in mineral spirits are glyceryl tris-12-hydroxystearate (hydrogenated castor oil) and/or mixed saturated $C_{18}$–$C_{36}$ fatty acid triglycerides (SYNCHROWAX HGL-C). The use of these materials is essential to the successful practice of the invention and it has been found that closely related materials such as glyceryl monostearate, tetraalkyl ammonium bentonite, glyceryl tristearate, and glyceryl tribehenate, are not effective to provide the desired redispersability in the mineral spirits dispersions. Fumed silica also failed to improve redispersability.

The amount of these latter redispersing additives may be varied from about greater than about 0.1 to less than 10 weight parts per 100 weight parts of slurry or dispersion, preferably 0.5 to 5 weight parts. More specifically, the mixed $C_{18}$–$C_{36}$ fatty acid glycerides, normally about 3 to 6 weight parts is satisfactory. For the glyceryl tris-12-hydroxystearate, an amount of about 1 to less than 6 weight parts has found to be satisfactory.

The amount of glyceryl tris-12-hydroxystearate required is related in part to the manner of mixing the additive in the dispersion, and the more efficient the mixing of the additive and the slurry, the less additive that may be necessary. High shear mixing systems are preferred. Such systems include ball mills, homogenizers, 3 roll mills, high speed dispersion means and the like. For example, with glyceryl tris-12-hydroxystearate, at least 4 weight parts are used when the mixing is with a paddle, 3 weight parts with a marine blade agitator, and 2 weight parts with high shear mixing equipment.

The additives are preferably added to dispersions at temperatures below 32° C. and the dispersions are heated after addition of the additives. Dispersion temperatures of 75° to 85° are suitable for the mixed fatty acid dispersants whereas dispersion temperatures for the hydroxystearates is about 35° to 60° C.

The block copolymer is added to the polymer dispersion which is normally maintained at an elevated temperature and then the temperature should be reduced to below about 35° C. before the hydroxystearate and/or triglycerides are added. It is not essential to maintain polymer dispersion at an elevated temperature when the block copolymer is added. This procedure is convenient since the polymer dispersion is hot when prepared. The reason for the cooling step resides in the fact that activation temperature of a particular additive is elevated which means that the additive must be added below such temperature to avoid swelling thereof before good dispersion of the hydroxystearate and/or triglycerides is achieved.

The stabilization additives are normally added to the dispersions or slurries after completion of polymerization, either in the reactor, a blowdown tank, or other storage vessel, or even to the shipping containers, if desired. Such dispersion generally contain 15 to 70% by weight of polymer solids but preferably 30 to 50%. Usually, it is more efficient to make the addition to large volues of the dispersions as soon after polymerization is completed as is practical and efficient. In any event, the additives preferably should be present in the dispersions before substantial settling has taken place. Of course, the additives may be added at any time so long as the dispersion or slurries can be redispersed so that the additive can be incorporated therein.

To demonstrate the practice of the invention, a series of compositions were prepared with a 33% slurry of a polymer of acrylic acid copolymerized with 1.3 parts per hundred of acrylic acid of trimethylolpropane diallyl ether, in mineral spirits.

Data on settling characteristics of dispersions of carboxyl containing polymers in mineral spirits was obtained on several dispersions containing 33% polymer solids. Stabilization systems tested were Pluronic L122 block copolymer by itself, glyceryl tris-12-hydroxystearate (G-12-H) by itself, and the combination of the two. The compositions were prepared by adding the block copolymer to the finished dispersion at 65° C. followed by homogenization in a suitable mixer. When the stearate was added by itself, it was also added to a finished dispersion at 30° C., which is below the activation temperature of the stearate. The dispersion was then heated to 55° C. followed by agitation, as in the case of the copolymer. The dispersion was cooled to 35° C. prior to being transferred to storage or shipping containers. When both of the additives were used, the block copolymer was added to the finished dispersion at 65% C., the dispersion was then homogenized and cooled below activation temperature, the stearate was added at 30° C. and again the dispersion was homogenized at 55° C. and cooled to ambient temperature. Pluronic L-122 block copolymer is generally defined as polyoxyethylene-polyoxypropylene block copolymer.

The various compositions, prepared as described herein, were then tested for settling stability at the indicated storage periods. In each instance, syneresis of each sample was determined by measuring the volume in a 55-gallon drum of the clear supernatant mineral spirits, total drum height being 36 inches. Caking to a hard mass was also measured in a static storage test where the dispersions were stored at ambient conditions. Of critical importance was the trasporation test which consisting of shipping the particular dispersion over about 600 miles by road following which, the dispersions were examined for settling and hard-caking. The data for the tests described above is summarized in Table I, below where Pluronic L-122 linear block copolymer is designated as "L-122", Tetronic 1102 branched block copolymer is designated as "T-1102", and the glyceryl tris-12-hydroxystearate (G-12-H) is designated as "G12H" all of which are given in weight percent based on the weight of the dispersion:

TABLE I

| Exp. No. | Stabilization System | Storage Time | Syneresis of Mineral Spirits | Caking In Static Test | Shipping Test |
|---|---|---|---|---|---|
| A | 1.5% L-122 | 1 month | 8" | Hard Cake | Hard Cake |
| B | 2.0% L-122 | 1 month | 8" | Hard Cake | Hard Cake |
| C | 3.0% L-122 | 1 month | 8" | Hard Cake | Hard Cake |
| D | 2.7% G12H | 1 day | <⅛" | None | Hard Cake |
|   |   | 3 days | 1" | None |   |
|   |   | 18 days | 2" | Small Amt. Cake |   |
|   |   | 30 days | 3" | Small Amt. Cake |   |
|   |   | 3 months | 5" | Hard Cake |   |
| E | 2.0% L-122 | 1 day | <⅛" | None | None |
|   | 2.7% GH12 | 3 days | <⅛" | None |   |
|   |   | 5 days | 1⅜" | None |   |
|   |   | 25 days | 1⅜" | None |   |
|   |   | 33 days | 2⅜" | None |   |
|   |   | 6 months | 4" | None | None |
| F | 3.0% L-122 | 1 day | <⅛" | None | None |
|   | 2.7% G12H | 3 days | <⅛" | None |   |
|   |   | 5 days | ⅜" | None |   |

TABLE I-continued

| Exp. No. | Stabilization System | Storage Time | Syneresis of Mineral Spirits | Caking In Static Test | Shipping Test |
| --- | --- | --- | --- | --- | --- |
| | | 24 days | 1 1/4" | None | |
| | | 32 days | 2 3/8" | None | None |
| | | 6 months | 4" | None | None |
| G | 2.0% T-1102 | 1 day | <1/4" | None | None |
| | 2.7% G12H | 13 days | 1 1/4" | None | |
| | | 21 days | 2 1/2 | None | |
| | | 6 months | | | |

In Table I, above, sample A was prepared using only 1.5% of Pluronic L-122 block copolymer without the stearate. After 1 month of storage, there was formed 8" of clear mineral spirits layered on top of the drum which as 36" in height overall. The static test of 1 month of storage produced hard cake, which was, of course, unacceptable. Fresh sample A was shipped by road, as described, and showed formation of hard cake, which was also unacceptable. The shipping test was conducted on fresh samples in all of the instances except in the case of samples E and F, on repeated shipments, there was no formation of hard cake after storage periods of 6 months for sample E and for storage periods of 32 days and 6 months for sample E. Although no hard cake was formed in sample E after 32 days and 6 months of storage and repeated shipments, these samples showed settling of solids, but these were readily redispersed. Sample F yielded polymer dispersions that were slightly more difficult to redisperse than Sample E. On the basis of experimental results, Sample E appears to be optimum in terms of pervention of caking of slurry on standing. Sample G, using the Tetronic 1102 branched block copolymer, was acceptable but was more difficult to agitate but was easily redispersible.

The data in Table I confirms the synergistic results obtained when a block copolymer is used with a stabilizer, such as the stearates, in terms of settling stability.

The mineral spirit dispersions of the carboxyl-containing polymers produced in accordance with this invention find many uses. Examples of suitable applications include the use as thickening and suspending agents in various mucilagenous and colloidal gel-like applications, in thickening latexes, in printing paste formulations, in oil well drilling muds, in textile operations, and in other applications where ion-sensitive polymers are required.

We claim:

1. Stable slurries of polymers of olefinically unsaturated carboxylic acids containing at least one activated carbon-to-carbon olefinic double bond and at least one carboxyl group in mineral spirits in concentrations from about 15 to 70 weight percent polymer containing stabilizing amounts of at least one block copolymer and at least one glyceryl tris-12-hydroxystearate and/or mixed saturated $C_{18}$–$C_{36}$ fatty acid triglycerides, said block copolymer is selected from block copolymers of propylene oxide and ethylene oxide having molecular weight in the range of about 1,000 to 20,000 and containing about 10 to 80% by weight of polyoxyethylene units.

2. Slurry of claim 1 wherein in said carboxylic acid, the olefinic bond is in the alpha-beta position with respect to a carboxyl group or is part of a terminal methylene group, and said polymers contain 40 to 100% by weight of said unsaturated carboxylic acid in polymerized form.

3. A slurry of claim 2 wherein said carboxylic acid is selected from the group consisting of acrylic acid, methacrylic acid, and maleic acid, and said block copolymer is selected from linear and branched copolymers.

4. Slurry of claim 3 wherein said carboxylic acid is acrylic acid present in said polymers in amounts of greater than 40 weight percent, said polymers also containing from 0 to 60 weight percent of at least one other vinylidene monomer containing at least one $CH_2<$ group copolymerized therewith.

5. A slurry of claim 4 wherein said acrylic acid is present in said polymers in amount greater than 70 weight percent, said polymers also containing less than 5 weight percent of a polyfunctional cross-linking vinylidene monomer containing at least two terminal $CH_2<$ groups.

6. Slurry of claim 5 wherein said cross-linking agent is selected from the group consisting of allyl pentaerythritol, allyl sucrose and trimethylol-propane diallylether.

7. Slurry of claim 6 containing 1 to 6 weight parts per one hundred weight parts of slurry of glyceryl tris-12-hydroxystearate.

8. Slurry of claim 6 containing 3 to 6 weight parts per one hundred weight parts of slurry of mixed saturated $C_{18}$–$C_{36}$ fatty acid triglyceride.

9. Slurry of claim 4 wherein amount of said block copolymer is 0.1 to 10 weight parts, and amount of said hydroxystearate and/or said triglycerides is also 0.1 to 10 weight parts, based on 100 weight parts of said slurry.

10. Slurry of claim 9 wherein said polymers consist of cross-linked units having weight average molecular weight in the range of about 1,000 to 2,000,000 and molecular weight of said block copolymer in the range of about 2,500 to 14,500.

11. Slurry of claim 10 wherein amount of said block copolymer is 0.5 to 5 weight parts and amount of said hydroxystearate and/or said triglycerides is also 0.5 to 5 weight parts, said block copolymer is selected from linear block copolymers prepared by sequential addition of propylene oxide and ethylene oxide to a propylene glycol base, branched block copolymers prepared by sequential addition of propylene oxide and ethylene oxide to a triol, and mixtures thereof, of about 3,000 to 8,000 molecular weight.

12. Slurry of claim 11 wherein said block copolymer is selected from trifunctional and tetrafunctional copolymers.

13. Slurry of claim 10 wherein said block copolymer is a tetrafunctional polyoxyethylene-polyoxypropylene ethylene diamine copolymer of 3,000 to 8,000 molecular weight.

14. Slurry of claim 12 wherein said polymers contain less than 30% by weight of an acrylic acid ester of the formula

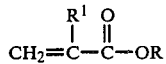
where $R^1$ is selected from hydrogen, methyl radical, and ethyl radical and R is an alkyl group containing 1 to 30 carbon atoms.
15. Slurry of claim 14 wherein $R^1$ is selected from hydrogen and methyl and R is an alkyl group containing 2 to 20 carbon atoms.
* * * * *